United States Patent
Kato et al.

[15] 3,665,213
[45] May 23, 1972

[54] GEAR POSITION SIGNAL GENERATING SYSTEM FOR ELECTRIC-TYPE AUTOMATIC TRANSMISSIONS

[72] Inventors: Takaaki Kato, Toyohashi; Mamoru Kawakubo, Kariya; Katsunori Ito, Kariya; Hisato Wakamatsu, Kariya, all of Japan

[73] Assignee: Nippondenso Kabushiki Kaisha, Kariya-shi, Aichi-ken, Japan

[22] Filed: June 9, 1970

[21] Appl. No.: 44,757

[30] Foreign Application Priority Data

June 13, 1969 Japan....................................44/47166

[52] U.S. Cl..............................307/218, 251/129, 307/203, 307/214, 328/94
[51] Int. Cl.......................................................H03k 19/22
[58] Field of Search..................307/214, 218, 203; 251/129;
328/94

[56] References Cited

UNITED STATES PATENTS 3,225,301  12/1965  McCann.................................307/214
3,231,727  1/1966  Springer................................307/214

*Primary Examiner*—Donald D. Forrer
*Assistant Examiner*—David M. Carter
*Attorney*—Cushman, Darby & Cushman

[57] ABSTRACT

In the electric-type automatic transmission with a torque converter, which includes a hydraulic control system to control frictional coupling means of the transmission and an electric control system to control distributing valves of the hydraulic control system, a gear position signal generating system to generate signals corresponding to gear positions of the transmission in order to enable indication of the gear position.

3 Claims, 5 Drawing Figures

3,665,213

GEAR POSITION SIGNAL GENERATING SYSTEM FOR ELECTRIC-TYPE AUTOMATIC TRANSMISSIONS

BACKGROUND OF THE INVENTION

1. Field of the Invention

This invention relates to gear position signal generating systems for generating gear position signals delivered to an electric processing circuit controlling the shifting action of the gear-shift mechanism of electric-type automatic transmissions with a torque converter.

2. Description of the Prior Art

In the electric-type automatic transmission provided with a torque converter, the automatic shifting of the gear-shift mechanism is carried out in such a manner that a gear-shift signal produced in accordance with the relative frictional speed between the pump and turbine of the torque converter causes the electric processing circuit to produce a corresponding voltage output so as to energize a corresponding electromagnetic valve solenoid, thereby switching a distributing valve (a shift valve) of the hydraulic system into the operative position admitting oil under pressure through the hydraulic system to be applied on the required frictional coupling means of the gear-shift mechanism to shift the same.

In this operation, it is required to generate a gear position signal indicating what gear position the transmission is placed in, in case the shifting conditions are different depending upon different gear positions, in which the automobile is travelling (for instance, in case of the three-forward-position transmission).

SUMMARY OF THE INVENTION

An object of the invention is to solve the above subject by the provision of a system for logically processing electric signals supplyed to the electromagnetic valves driving the distributing valves of the hydraulic system through a logic circuitry to produce resultant signals corresponding to gear positions of the gear-shift mechanism of the automatic transmission, as well as enabling the indication of gear positions by means of lamps.

Another object of the invention is to provide a gear position signal generating system, which is reliable in operation and simple in construction, because of a totally electrical construction free from mechanical frictional and engaging-and-disengaging parts.

According to the invention, electric signals supplyed to the electromagnetic valves of the hydraulic system of the automatic transmission are also led to a processing circuit comprising NOT circuits and AND circuits for obtaining gear position signals, so that the invention can feature excellent effects of simple construction, freedom from mechanical frictional and engaging-and-disengaging parts, the ability to generate the multi-positional gear position signals and to indicate the gear positions with purely electrical means, and a reliable operation by virture of the use of logic circuits and so forth.

DESCRIPTION OF THE PREFERRED EMBODIMENTS

The invention will now be described in conjunction with some preferred embodiments thereof with reference to the accompanying drawings.

Figure 1:
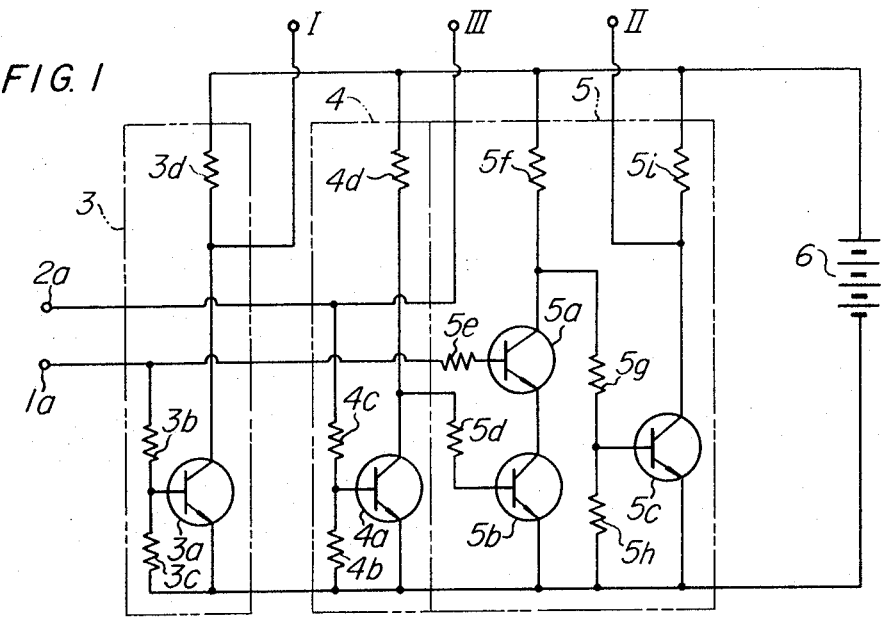
FIG. 1 is a circuit diagram of an embodiment of the invention for application to the three-forward-position transmission.
Figure 2A:
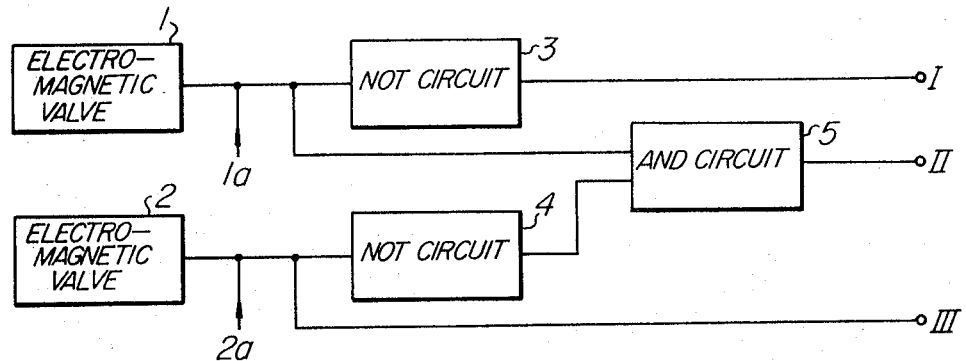
FIG. 2a is a block diagram of the embodiment of FIG. 1.

FIG. 1 shows in a diagram form an embodiment of the invention as applied in the three-forward-position transmission. This embodiment is also shown in FIG. 2a in block form. Referring now to FIG. 2a, it comprises an electromagnetic valve 1 provided with such means as a solenoid for shifting the in-mesh gear from the low gear into the second gear, a similar electromagnetic valve 2 for shifting from the second gear into the top gear, NOT circuits 3 and 4 and an AND circuit 5. At terminals I, II and III there appears a signal when the gear-shift mechanism is in low gear (the first speed), in second gear (the second speed) and in top gear (the third speed) respectively. Reference symbols 1a and 2a indicates respective leads, through which current passes to the solenoids of the respective electromagnetic valves 1 and 2.

In operation, when neither of the electromagnetic valves 1 and 2 is operative, no signal is present in either of the leads 1a and 2a, so that only at the terminal I appears a signal corresponding to the low gear position through the action of the NOT circuit 3. Though the NOT circuit 4 produces a signal since there is no signal in the lead 2a, the AND circuit 5 produces no output signal because at its one input terminal connected to the lead 1a no signal is present.

When only the electromagnetic valve 1 is operative, there is a signal only in the lead 1a, with which signal there appears no signal at the terminal I owing to the presence of the NOT circuit 3, and which signal is added to one input terminal of the AND circuit 5. Also, because of the absence of signal in the lead 2a the NOT circuit produces an output signal appearing at the other input terminal of the AND circuit 5, which thus delivers a signal corresponding to the second gear position to the terminal II.

When both of the electromagnetic valves 1 and 2 are operative, no signal appears at the terminals I and II owing to the action of the NOT circuits 3 and 4 and the AND circuit 5, but a signal in the lead 2a appears at the terminal III, indicating the correspond-ing top gear position.

The above operation is tabulated as follows.

| Electromagnetic Valve 1 | Inoperative | Operative | Operative |
|---|---|---|---|
| Electromagnetic Valve 2 | Inoperative | Inoperative | Operative |
| Gear Position | Low Gear | Second Gear | Top Gear |

The electric circuit outlined in the block form in FIG. 2a is illustrated in detail in FIG. 1. As is shown in the Figure, it comprises the NOT circuit 3 including a transistor 3a and resistors 3b, 3c and 3d, the NOT circuit 4 including a transistor 4a and resistors 4b, 4c and 4d, and the AND circuit 5 including transistors 5a, 5b and 5c and resistors 5e, 5f, 5g, 5h and 5i. The transistors 3a and 5c have respective collectors connected to the respective terminals I and II, that provide the respective signals corresponding to the low and second gear positions respectively, while the lead line 2a is connected to the terminal III that provides the signal corresponding to the top gear position. Numeral 6 designates a power supply.

When no signal is present in the lead 1a, the transistor 3a is off, so that the voltage of the power supply 6 appears at the terminal I as the signal indicating that the gears are placed in the first gear position. When a signal is applied to the lead 1a but no signal is present in the lead 2a, the transistor 4a is off, so that the substantially same voltage as that of the power source 6 appears on the collector of the transistor 4a and on the base of the transistor 5b, so as to cause a current flow therethrough. Also, by the signal coming from the lead 1a the transistor 5a is triggered to reduce the base voltage on the transistor 5c to zero. Thus, the collector voltage on the transistor 5c is increased up to the voltage of the power supply 6 and appears at the terminal II as the signal indicating that the gears are in the second gear position. When a signal appears in the lead 2a in addition to the signal in the lead 1a, at the terminal I the signal remains absent since the transistor 3a carries current, at the terminal II the signal disappears since the signal from the lead 2a triggers the transistor 4a to cut off the transistor 5b so as to trigger the transistor 5c, and at the terminal III appears the signal indicating that the gears are in the third gear position.

The above-described embodiment is concerned with the three-forward-position transmission, but the invention may also be applied in other multi-position transmissions.

Figure 2B:
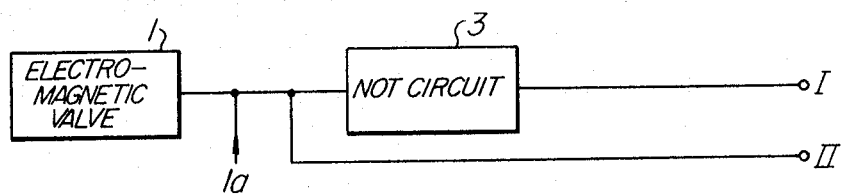
FIG. 2b is a block diagram of a further embodiment of the invention for application to the two-forward-position transmission.
Figure 2C:
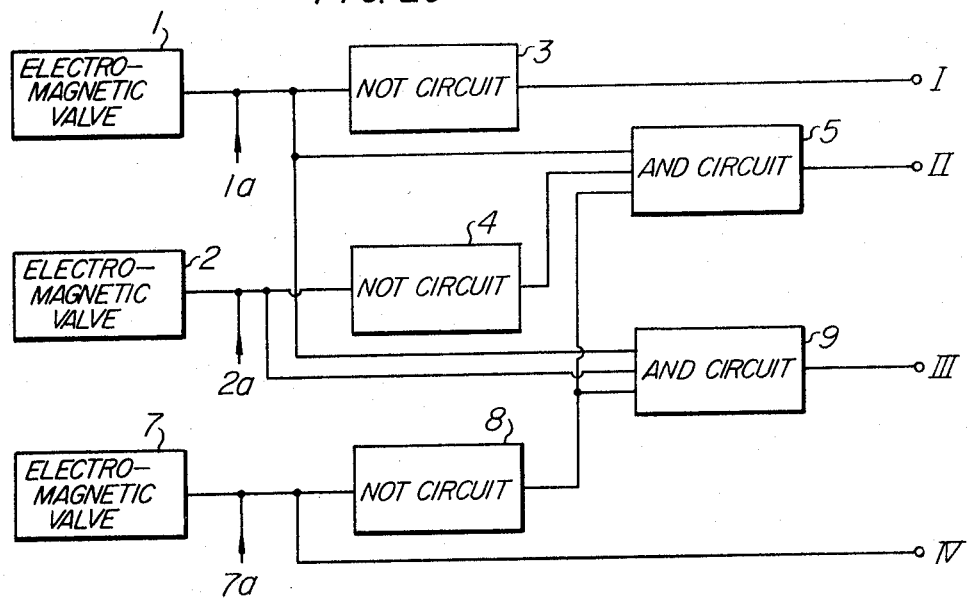
FIG. 2c is a block diagram of a further embodiment of the invention for application to the four-forward-position transmission.

FIG. 2c shows an embodiment for the four-forward-position transmission. It comprises three NOT circuits 3, 4 and 8 respectively associated with three electromagnetic valves 1, 2 and 7 and two AND circuits 5 and 9, whereby the low (the first), second (the second), third (the third) and top (the fourth) gear position signals may be caused to appear at the respective output terminals I, II, III and VI.

Figure 2D:
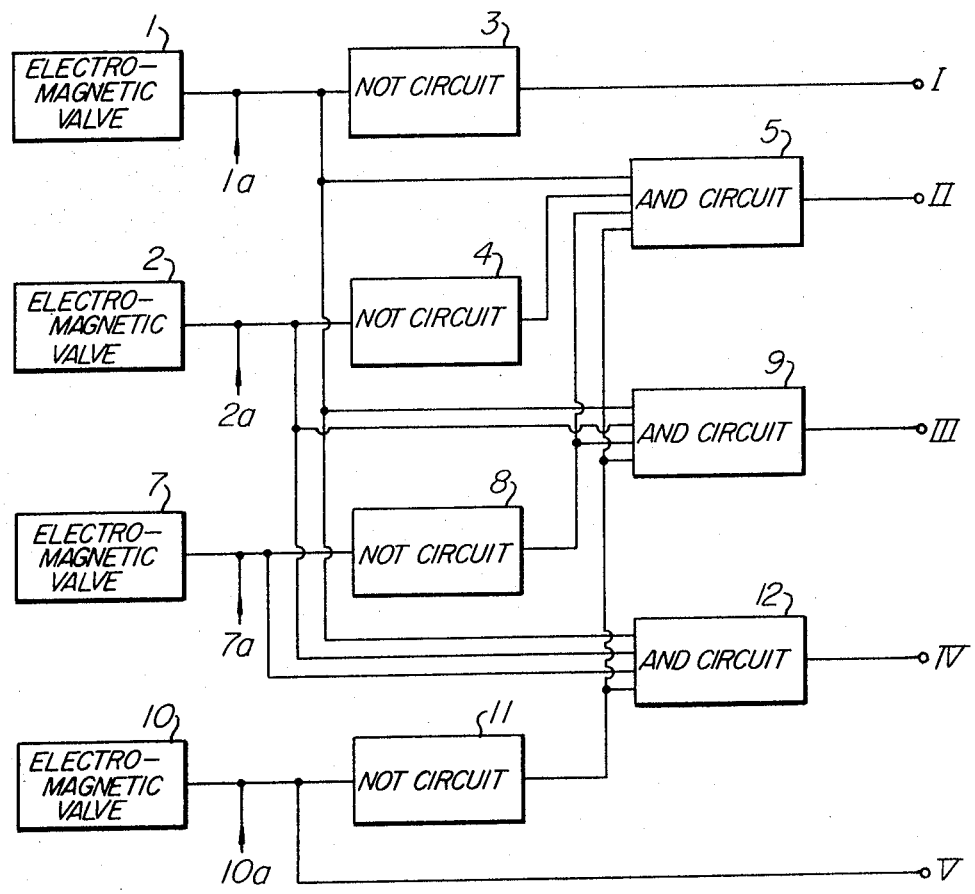
FIG. 2d is a block diagram of a further embodiment of the invention for application to the five-forward-position transmission.

FIG. 2d shows an embodiment for the five-forward-position transmission. It comprises four NOT circuits 3, 4, 8 and 11 respectively associated with four electromagnetic valves 1, 2, 7 and 10 and three AND circuits 5, 9 and 12.

In general, for a transmission system having n forward positions the gear position signal generating means may comprise $(n-1)$ NOT circuits associated with respective $(n-1)$ electromagnetic valves and $(n-2)$ AND circuits.

This statement, of course, applies to the case of the two-forward-position transmission, as shown in FIG. 2b.

We claim:

1. A gear position signal generating system for an $n$-gear-position automatic transmission comprising $(n-1)$ NOT circuits each receiving a signal from one of $(n-1)$ electromagnetic valves controlling the shifting of a gear-shift mechanism, and $(n-2)$ AND circuits individually receiving signals from the first to K-th (K being natural numbers no greater than $(n-2)$ individually corresponding to the respective electromagnetic valves or NOT circuits) electromagnetic valves and signals from the $(K+1)$-th to $(n-1)$-th NOT circuits, whereby the first gear position signal is derived from the first NOT circuit, the second to $(n-1)$-th gear position signals are derived from the respective first to $(n-2)$-th AND circuits, and the $n$-th gear position signal is derived from the $(n-1)$-th electromagnetic valve.

2. A gear position signal generating system for a three-gear-position automatic transmission comprising a first and a second NOT circuits respectively receiving a signal from a first and a second electromagnetic valves controlling the shifting of a gear shift mechanism, and an AND circuit receiving a signal from said first electromagnetic valve and a signal from the second NOT circuit, whereby the first gear position signal is derived from the first NOT circuit, the second gear position signal is derived from said AND circuit, and the third gear position signal is derived from the second electromagnetic valve.

3. In combination:
   valve means for controlling the shifting of a gear-shift mechanism having a plurality of gear conditions and having a plurality of valve conditions each associated with a different one of said gear conditions, said controlling means including first and second electromagnetic valves each having first and second electrical conditions,
   means electrically connected to said first and second valves for detecting the valve condition and hence the associated gear condition and producing an electrical signal indicating that condition including,
   first and second NOT circuits each having an output and an input connected to said first and second valves respectively, and
   an AND circuit having an output and an input connected to said output of said second NOT circuit and to said second valve so that a given output signal is provided at said output of said first NOT circuit when said gear-shift mechanism is in a first gear condition, said given output signal is provided at said output of said AND circuit when said gear-shift mechanism is in a second gear condition and said given output signal is provided at neither said output of said first NOT circuit nor said output of said AND circuit when said gear-shift mechanism is in a third gear condition.

* * * * *